(12) United States Patent
Wang et al.

(10) Patent No.: US 11,218,946 B2
(45) Date of Patent: Jan. 4, 2022

(54) ACCESS CONTROL METHOD AND APPARATUS

(71) Applicant: Huawei Technologies Co., Ltd., Shenzhen (CN)

(72) Inventors: Yuan Wang, Shanghai (CN); Fenqin Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/294,641

(22) Filed: Mar. 6, 2019

(65) Prior Publication Data
US 2019/0246334 A1 Aug. 8, 2019

Related U.S. Application Data

(63) Continuation of application No. PCT/CN2016/098338, filed on Sep. 7, 2016.

(51) Int. Cl.
*H04W 48/06* (2009.01)
*H04W 48/18* (2009.01)
(Continued)

(52) U.S. Cl.
CPC .......... *H04W 48/06* (2013.01); *H04W 48/02* (2013.01); *H04W 48/08* (2013.01); *H04W 48/14* (2013.01); *H04W 48/16* (2013.01); *H04W 48/18* (2013.01)

(58) Field of Classification Search
CPC ..... H04W 48/02; H04W 48/06; H04W 48/14; H04W 48/08; H04W 48/16; H04W 48/18
See application file for complete search history.

(56) References Cited

U.S. PATENT DOCUMENTS

2011/0199905 A1* 8/2011 Pinheiro ........... H04W 28/0215
370/235
2012/0039295 A1 2/2012 Quan et al.
(Continued)

FOREIGN PATENT DOCUMENTS

CN 102075871 A 5/2011
CN 102083171 A 6/2011
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0, pp. 1-374, 3rd Generation Partnership Project, Valbonne, France (Jun. 2016).
(Continued)

*Primary Examiner* — Dinh Nguyen
(74) *Attorney, Agent, or Firm* — Leydig, Voit & Mayer, Ltd.

(57) ABSTRACT

An access control method includes: receiving, by a network device, an access request message from user equipment (UE); determining, by the network device based on the access request message, a network slice that the UE requests to access; and when the network device determines to reject an access request of the UE for accessing the network slice, returning, by the network device, a rejection response message to the UE, where the rejection response message includes back-off condition information, and the back-off condition information indicates a condition under which the UE requests again to access the network slice.

16 Claims, 5 Drawing Sheets

(51) Int. Cl.
*H04W 48/16* (2009.01)
*H04W 48/08* (2009.01)
*H04W 48/02* (2009.01)
*H04W 48/14* (2009.01)

(56) References Cited

U.S. PATENT DOCUMENTS

| | | | | |
|---|---|---|---|---|
| 2012/0281647 | A1* | 11/2012 | Kuo | H04L 1/1812 370/329 |
| 2013/0160093 | A1 | 6/2013 | Klein | |
| 2014/0092734 | A1* | 4/2014 | Ljung | H04W 28/0205 370/230 |
| 2014/0204754 | A1* | 7/2014 | Jeong | H04W 28/0289 370/235 |
| 2016/0073327 | A1 | 3/2016 | Clougherty et al. | |
| 2016/0278096 | A1* | 9/2016 | Watfa | H04W 28/12 |
| 2017/0142591 | A1* | 5/2017 | Vrzic | H04W 24/08 |
| 2018/0352501 | A1* | 12/2018 | Zhang | H04W 48/18 |
| 2019/0313473 | A1* | 10/2019 | Kim | H04W 76/25 |

FOREIGN PATENT DOCUMENTS

| | | |
|---|---|---|
| CN | 102413450 A | 4/2012 |
| CN | 102448110 A | 5/2012 |
| CN | 102754485 A | 10/2012 |
| CN | 102769891 A | 11/2012 |
| CN | 104253767 A | 12/2014 |
| CN | 105813195 A | 7/2016 |
| CN | 106465124 A | 2/2017 |
| EP | 2472986 A1 | 7/2012 |
| RU | 2516869 C2 | 5/2014 |
| RU | 2587650 C2 | 6/2016 |
| WO | 2015142372 A1 | 9/2015 |
| WO | 2016058482 A1 | 4/2016 |

OTHER PUBLICATIONS

"3rd Generation Partnership Project; Technical Specification Group Radio Access Network; Study on New Radio Access Technology; Radio Access Architecture and Interfaces (Release 14)," 3GPP TR 38.801 V0.2.0, pp. 1-20, 3rd Generation Partnership Project—Valbonne, France (Jun. 2016).

"Solution for selection of a network slice instance," SA WG2 Meeting #116, S2-164258 (revision of S2-163978), Vienna, AT, pp. 1-5, 3rd Generation Partnership Project—Valbonne, France (Jul. 11-15, 2016).

"RAN configuration of network slices," RAN WG3 Meeting #92, R3-161135, Nanjing, China, pp. 1-5,3rd Generation Partnership Project—Valbonne, France (May 23-27, 2016).

"UE Slice Association/Overload control Procedure," 3GPP TSG SA WG2 Meeting #115, S2-162981, Nanjing, China (revision of S2-16xxxx), pp. 1-8, 3rd Generation Partnership Project—Valbonne, France (May 23-27, 2016).

"Congestion and overload control for mobility management (MM)," SA WG2 Meeting #116bis, S2-164547, Sanya, China, pp. 1-4, 3rd Generation Partnership Project, Valbonne, France (Aug. 29-Sep. 2, 2016).

LG Electronics, "New Key Issue: Congestion and access control for Next Generation Network Architecture," SA WG2 Meeting #116, Vienna, Austria, S2-164113, total 6 pages, 3rd Generation Partnership Project, Valbonne, France (Jul. 11-15, 2016).

CN/202010969484.6, Office Action/Search Report, dated Aug. 2, 2021.

* cited by examiner

ACCESS CONTROL METHOD AND APPARATUS

CROSS-REFERENCE TO RELATED APPLICATIONS

This application is a continuation of International Application No. PCT/CN2016/098338, filed on Sep. 7, 2016, the disclosure of which is hereby incorporated by reference in its entirety.

TECHNICAL FIELD

The present disclosure relates to the field of wireless communications technologies, and in particular, to an access control method and an apparatus.

BACKGROUND

As a mobile communications network evolves and a large quantity of new applications continuously emerge, a communication operator puts forward a requirement of deploying network slices (NS) for different service scenarios. A 5G mobile communications system introduced by the 3rd Generation Partnership Project (3GPP) organization is used as an example, and mobile broadband (MBB), vehicle to vehicle (V2V) communication, machine type communication (MTC), an industry control system (ICS), and an intelligent transport system (ITS) will become main service scenarios in a new generation communications system. Because these service scenarios have different communication requirements, the communication operator may deploy a dedicated network slice for each service scenario, the network slice dedicatedly used in each service scenario may provide a customized mobile management service, a customized security service, a customized session management service, and the like. A user equipment (UE) having a communication feature is registered on a network slice. As shown in FIG. 1, all UEs having a V2V function are registered on a network slice 2 dedicatedly used in a V2V service scenario, and all UEs having an MTC function are registered on a network slice 3 dedicatedly used in an MTC service scenario. A network slice is equivalent to a private network that is deployed by the operator in a public land mobile network (PLMN) for a type of UE having a same or similar service requirement. The network slice includes network functions customized for the type of UE, and these network functions may provide a customized quality of service (QoS) guarantee, a customized service-level agreement (SLA) guarantee, and the like for the UE. The operator may deploy a plurality of dedicated core networks to implement a network slice having a core network function.

By deploying the network slices used in different service scenarios, the communication operator may pertinently manage and maintain different types of user equipments, so as to implement dedicated use of the private network, provide a differentiated service, and reduce network maintenance costs.

When access to a network by UE needs to be controlled in the prior art, a congestion control technology based on a mobility management entity (MME) is usually used. Congestion control is performed based on an MME granularity by using the technology, and the UE cannot initiate an access request for the MME within a back-off time period set on a network side.

In the foregoing solution in the prior art, once the MME rejects an access request from UE, the UE cannot use any network service. This reduces user service experience.

SUMMARY

To improve user service experience in a wireless network environment, this application describes an access control method and an apparatus.

According to one aspect, an embodiment of this application provides an access control method, where the method includes:

receiving, by a network device, an access request message sent by user equipment (UE);

determining, by the network device based on the access request message, a network slice that the UE requests to access; and when the network device determines to reject an access request of the UE for accessing the network slice, returning, by the network device, a rejection response message to the UE, where the rejection response message includes back-off condition information, and the back-off condition information indicates a condition under which the UE requests again to access the network slice.

According to another aspect, an embodiment of the present disclosure provides an access control method, including:

sending, by user equipment (UE), an access request message to a network device; and receiving, by the UE, a rejection response message from the network device, where the rejection response message includes back-off condition information, the back-off condition information indicates a condition under which the UE requests again to access a network slice, and the network slice is determined by the network device based on the access request message.

According to another aspect, an embodiment of the present disclosure provides a network device, including a receiving module, a processing module, and a sending module, where the receiving module is configured to receive an access request message sent by user equipment (UE);

the processing module is configured to: determine, based on the access request message, a network slice that the UE requests to access, and determine whether to reject an access request of the UE for accessing the network slice; and when the processing module determines to reject the access request of the UE for accessing the network slice, the sending module returns a rejection response message to the UE, where the rejection response message includes back-off condition information, and the back-off condition information indicates a condition under which the UE requests again to access the network slice.

According to another aspect, an embodiment of the present disclosure provides user equipment (UE), including a sending module and a receiving module, where the sending module is configured to send an access request message to a network device; and the receiving module is configured to receive a rejection response message from the network device, where the rejection response message includes back-off condition information, the back-off condition information indicates a condition under which the UE requests again to access a network slice, and the network slice is determined by the network device based on the access request message.

According to still another aspect, an embodiment of the present disclosure provides a computer storage medium, where the computer storage medium stores a computer software instruction, and when the computer software instruction runs, a network device performs the method recorded in the embodiment of the present disclosure.

Optionally, the network device may be a radio access network node (RAN node), a control plane entity (CPE), or a network slice selection function entity (NSSFE).

It should be noted that, in this embodiment of the present disclosure, if the network device is the radio access network node (RAN node), the RAN node may determine, based on identification information of a network slice carried in an access request message, the network slice that UE requests to access.

If the network device is the control plane entity (CPE), when identification information of a network slice is carried in an access request message, the CPE may determine, based on the identification information, the network slice that the UE requests to access; or when identification information of a network slice is not carried in an access request message, that the network device determines, based on the access request message, a network slice that the UE requests to access is specifically that the CPE selects, based on one or a combination of the following information, a network slice providing a service for the UE: a service type carried in the access request message, subscription data of the UE, capability information of the UE, network policy information, and the like.

If the network device is the network slice selection function entity (NSSFE), that the network device determines, based on an access request message, a network slice that the UE requests to access is specifically that the NSSFE selects, based on one or a combination of the following information, a network slice providing a service for the UE: a service type carried in the access request message, subscription data of the UE, capability information of the UE, network policy information, and the like.

According to still another aspect, an embodiment of the present disclosure provides a computer storage medium, where the computer storage medium stores a computer software instruction, and when the computer software instruction runs, user equipment (UE) performs the method recorded in the embodiment of the present disclosure.

An embodiment of the present disclosure provides a communications system, including a network device and at least one user equipment (UE).

Optionally, the network device may be a radio access network node (RAN node), a control plane entity (CPE), or a network slice selection function entity (NSSFE).

In the solutions provided in the embodiments, the back-off condition information is carried in the rejection response message returned to the UE, the condition under which the UE may access the network slice again is set, and when the condition corresponding to the back-off condition information is not met, the UE no longer initiates the request for accessing the network slice. Therefore, isolation of the network slice is ensured and user service experience is improved.

BRIEF DESCRIPTION OF DRAWINGS

To describe technical solutions in embodiments of the present disclosure more clearly, the following briefly describes the accompanying drawings. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes technical solutions in embodiments of the present disclosure with reference to the accompanying drawings.

Figure 1:
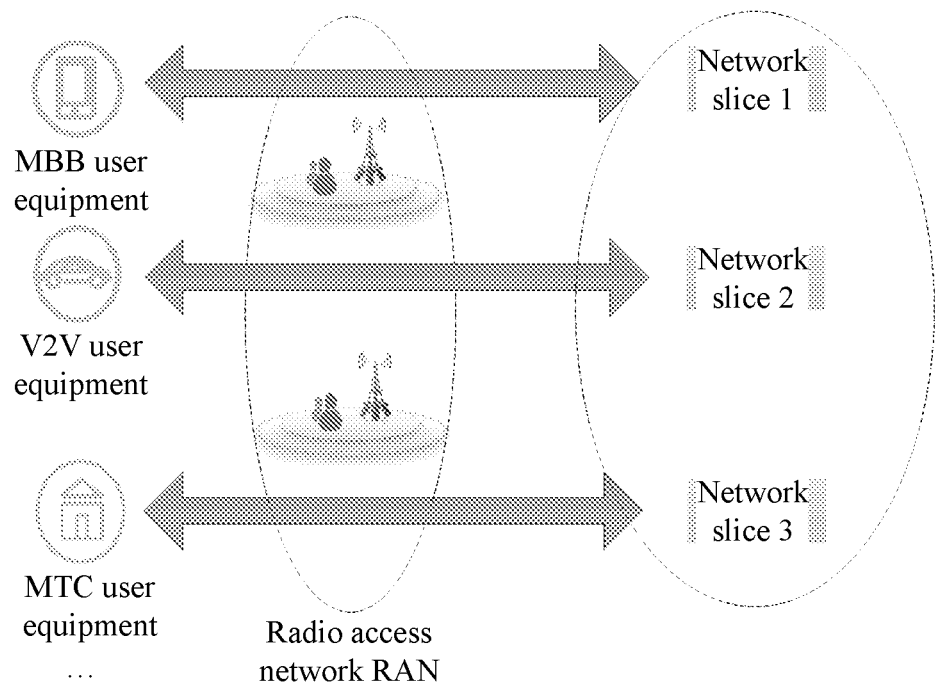
FIG. 1 is a schematic diagram of a communications system in which a network slice is deployed in the prior art.
Figure 2:
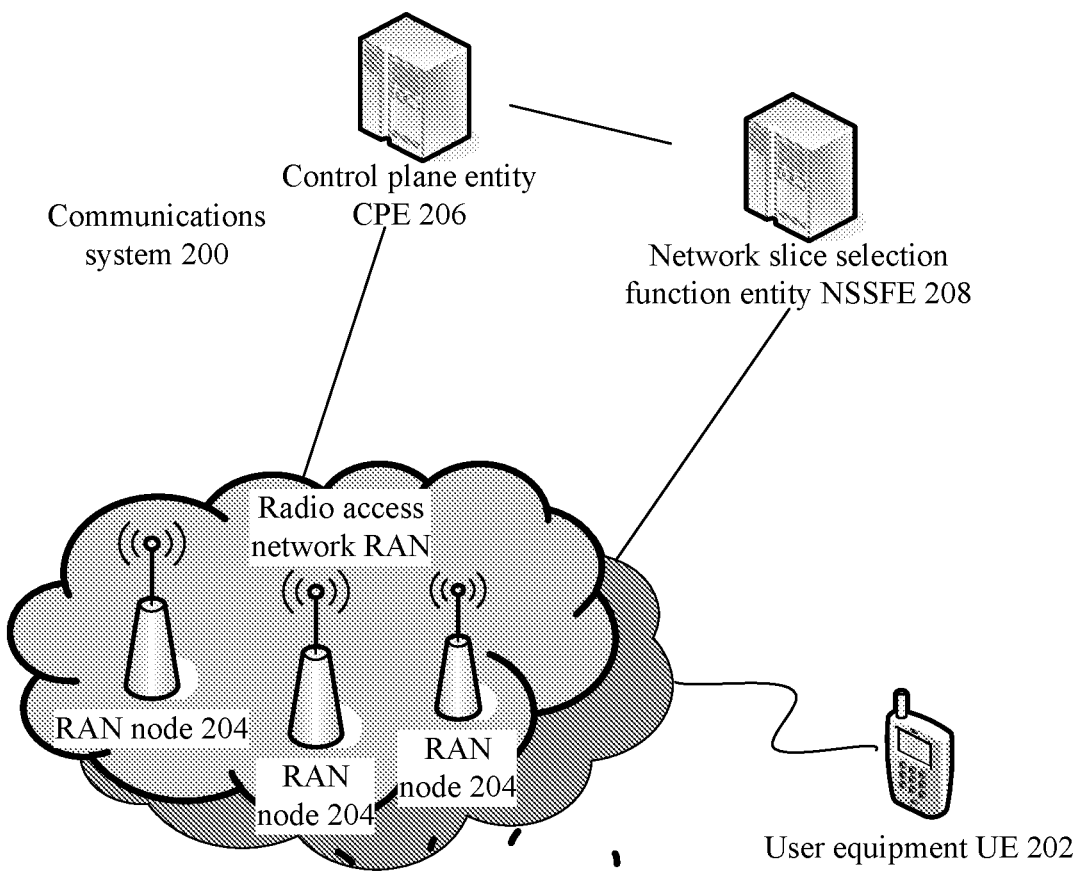
FIG. 2 is a schematic diagram of a communications system according to an embodiment of the present disclosure.

To improve user service experience in a wireless network environment, an embodiment of the present disclosure puts forward a solution based on a communications system shown in FIG. 2, to improve network performance of the communications system. As shown in FIG. 2, an embodiment of the present disclosure provides a communications system 200. The communications system 200 may include the following communications entities:

at least one UE 202, where the UE 202 may be a conventional 2G, 3G, or 4G terminal, or may be a 5G terminal supporting a 5G mobile communications technology;

a radio access network (RAN) including at least one radio access network node (RAN node) 204, where the radio access network node RAN node 204 may be a base station (BS), a distributed base station, or a cloud radio access network (cloud RAN, CRAN) device, or may be an access network device including both a radio network controller (RNC) and a base station; the base station, the distributed base station, the cloud radio access network device, and the access network device are collectively referred to as the radio access network node RAN node in this specification;

a control plane entity (CPE) 206, configured to provide a control plane network function, where the control plane entity CPE may be sometimes also referred to as a control plane network function (CPNF), and the CPE and the CPNF are not distinguished in this embodiment of the present disclosure; the control plane entity CPE 206 is responsible for executing a control plane network function of a core network, and the CPE 206 may be specifically a physical network element in a form such as a mobility management entity (MME), a serving GPRS support node (SGSN), or a common control plane network function (CCPNF), or may be a virtual machine or a device on which a software package is installed; in this embodiment of the present disclosure, the CPE 206 may simultaneously support a plurality of network slices, and provide the UE with a service corresponding to a type of a network slice; certainly, the CPE 206 may alternatively support a plurality of network slices of different types simultaneously; the plurality of network slices may be uniquely identified by using a network slice type, a network slice identifier (ID), a network slice instance identifier (ID), or the like, or a combination thereof, and the information used to uniquely identify the network slices is referred to as identification information of the network slices; and a network slice selection function entity (NSSFE) 208, where the network slice selection function entity 208 may select, for the UE based on information such as subscription data of the UE, capability information of the UE, or a network policy set by an operator, or a combination thereof, a network slice capable of providing a service for the UE; and the NSSFE 208 may be deployed as an independent network element, or implemented on the CPE 206 by serving as a function module inside the CPE 206.

The communications system in this embodiment of the present disclosure may be various 3GPP communications systems, such as a general packet radio system (GPRS), a universal mobile telecommunications system (UMTS), and an evolved packet system. The terms "system" and "network" can be interchanged with each other. In addition, the communications system 200 may be further applicable to a future 3GPP communications system, for example, a next generation network communications system (NexGen). Alternatively, the communications system 200 may be a non-3GPP mobile communications system defined by another standards organization. A system architecture and a service scenario that are described in this embodiment of the present disclosure are used to more clearly describe a technical solution in this embodiment of the present disclosure, and do not constitute a limitation to the technical solution provided in this embodiment of the present disclosure. A person of ordinary skill in the art may know that as a network architecture evolves and a new service scenario appears, the technical solution provided in this embodiment of the present disclosure is also applicable to a similar technical problem.

In this embodiment of the present disclosure, the radio access network (RAN) may be various radio access technology (RAT) systems, such as a Code Division Multiple Access (CDMA) system, a Time Division Multiple Access (TDMA) system, a Frequency Division Multiple Access (FDMA) system, an orthogonal frequency division multiple access (OFDMA) system, and a single carrier frequency division multiple access (SC-FDMA) system. The terms "system" and "network" can be interchanged with each other. The CDMA system may implement a wireless technology, such as Universal Terrestrial Radio Access (UTRA) or CDMA2000. UTRA may include a wideband CDMA (WCDMA) technology and another variant of CDMA technology. CDMA2000 may cover an interim standard (IS) 2000, an IS-95 standard, and an IS-856 standard. The TDMA system may implement a wireless technology, for example, a Global System for Mobile Communications (GSM). The OFDMA system may implement a wireless technology, such as Evolved Universal Terrestrial Radio Access (evolved UTRA, E-UTRA), Ultra Mobile Broadband (UMB), the IEEE 802.11 (Wi-Fi), the IEEE 802.16 (WiMAX), the IEEE 802.20, or flash OFDMA. The UTRA and the E-UTRA correspond to the UMTS and an evolved release of the UMTS. In 3GPP standards, the Long Term Evolution (LTE) and various LTE-based evolved releases are new releases of the UMTS that use the E-UTRA. In addition, the communications system 200 may be further applicable to a future-proofed communications technology. A system architecture and a service scenario that are described in this embodiment of the present disclosure are used to more clearly describe a technical solution in this embodiment of the present disclosure, and do not constitute a limitation to the technical solution provided in this embodiment of the present disclosure. A person of ordinary skill in the art may know that as a network architecture evolves and a new service scenario appears, the technical solution provided in this embodiment of the present disclosure is also applicable to a similar technical problem.

The RAN node in this embodiment of the present disclosure is an apparatus that is deployed in the radio access network and that is configured to provide a wireless communication function for the UE. The RAN node may include various forms, such as a macro base station, a micro base station (which is also referred to as a small cell), a relay node, and an access point. Names of devices having a base station function may be different in systems using different radio access technologies. For example, a device having a base station function is referred to as an evolved NodeB (eNB, or eNodeB) in an LTE system, a NodeB in a 3rd generation (3G) system, and the like. Alternatively, a device having a base station function may be an apparatus that is applicable to the future-proofed communications technology and that provides a wireless communication function for the UE, for example, a 5G RAN node in a 5G mobile communications system.

The user equipment (UE) used in this embodiment of the present disclosure may include various devices having a wireless communication function, such as a handheld device, a vehicular device, a wearable device, a computing device, or another processing device connected to a wireless modem. Alternatively, the UE may be referred to as a mobile station (MS), a terminal, or terminal equipment. The user equipment (UE) may be a subscriber unit, a cellular phone, a smartphone, a wireless data card, a personal digital assistant (PDA) computer, a tablet computer, a wireless modem, a handheld device, a laptop computer, a cordless phone, or a wireless local loop (WLL) station, or a machine type communication (MTC) terminal, or the like. For ease of description, the devices mentioned above are collectively referred to as UE in all embodiments of the present disclosure.

All messages exchanged between the communications entities used in this embodiment of the present disclosure are merely an example of descriptions, and may be implemented by using another message defined in different mobile communication standards (such as a 2G mobile communications system, a 3G mobile communications system, a 4G mobile communications system, or the 5G mobile communications system), or may be implemented by using a non-standard message defined by an operator or a device manufacturer in an actually deployed mobile communications system.

Figure 3:
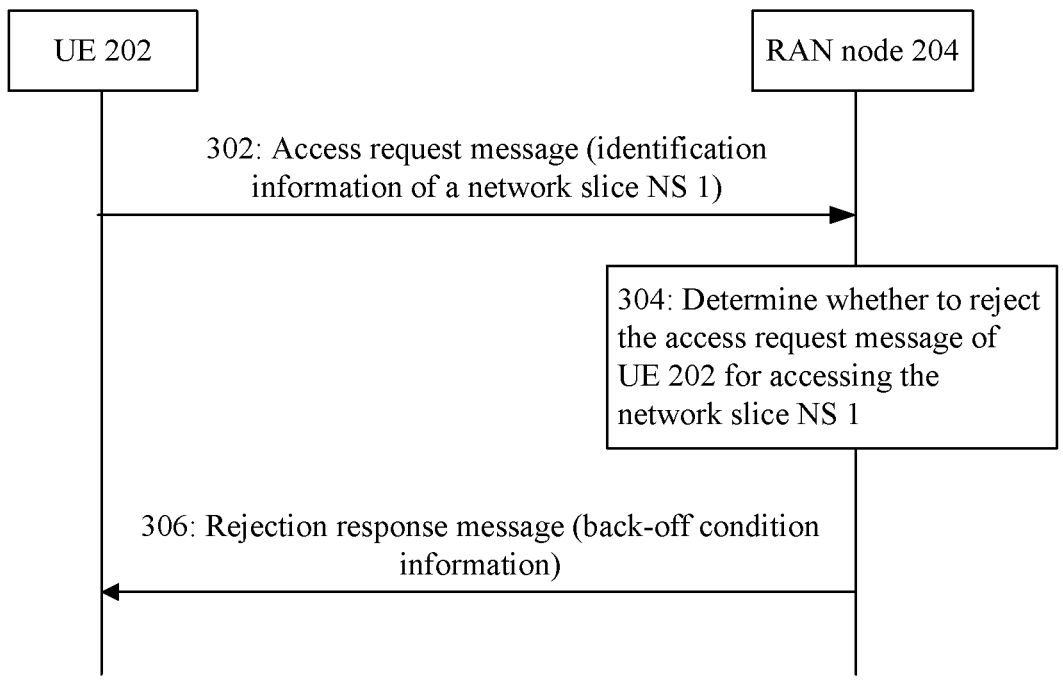
FIG. 3 is a schematic diagram of an access control method according to an embodiment of the present disclosure.

Based on the communications system shown in FIG. 2 in the embodiment of the present disclosure, referring to FIG. 3, an access control method is provided. The access control method may include the following parts:

Part 302: The user equipment UE 202 sends an access request message to the radio access network node RAN node 204 in the communications system 200, where the access request message includes identification information of a network slice NS 1, and the identification information indicates the network slice NS 1 that the UE 202 requests to access. The network slice NS 1 is a network slice supported by the control plane entity CPE 206 in the communications system 200.

The access request message sent by the UE 202 may be an RRC connection setup complete message or an RRC request message. The identification information of the network slice NS 1 may be one or a combination of a type (network slice type) of the network slice NS 1, a network slice identifier (ID) of the network slice NS 1, and a network slice instance identifier (ID) of the network slice NS 1.

Part 304: After receiving the access request message sent by the UE, the RAN node 204 determines whether to accept or reject the access request message of the UE 202 for accessing the network slice NS 1. When the RAN node 204 determines to reject the access request message initiated by the UE 202 in part 302, a rejection response message is generated and sent to the UE 202. The rejection response message may include back-off condition information, and the back-off condition information indicates a condition under which the UE 202 requests again to access the network slice NS 1.

It should be noted that the RAN node 204 may determine, based on locally stored information or information obtained from the control plane entity CPE 206 in the communications system 200, whether to accept the access request message of the UE 202 for accessing the network slice NS 1.

It should be noted that if the access request message in part 302 is the RRC connection setup complete message, the rejection response message in part 304 may be an RRC release message; or if the access request message is the RRC request message, the rejection response message may be an RRC reject message.

The back-off condition information in the rejection response message may be a back-off time parameter, and the back-off time parameter indicates that the UE 202 cannot initiate, again within a back-off period corresponding to the back-off time parameter, an access request for requesting to access the network slice NS 1. After the back-off period expires, the UE 202 is allowed to request again to access the network slice NS 1. It should be noted that the access request initiated again by the UE 202 for accessing the network slice NS 1 in this embodiment of the present disclosure may be an access request initiated actively by the UE 202 based on a service requirement for accessing the network slice NS 1; or may be an access request, which is initiated when an event occurs after the UE 202 receives a message sent by a network side, for accessing the network slice NS 1.

Alternatively, the back-off condition information in the rejection response message may be a back-off event parameter, that indicates that when an event corresponding to the back-off event parameter occurs, the UE 202 is allowed to request again to access the network slice NS 1. The event corresponding to the back-off event parameter may be that the UE 202 receives a paging message of the radio access network RAN, that the UE 202 initiates a periodic location update process, that the UE 202 initiates an aperiodic location update process, or the like. During specific implementation, the back-off event parameter may be defined by using a value or a field. For example, a value "001" represents that when the UE 202 receives the paging message of the radio access network RAN, the UE 202 is allowed to request again to access the network slice NS 1.

Certainly, the back-off condition information may alternatively be a combination of a back-off time parameter and a back-off event parameter. For example, within the back-off period corresponding to the back-off time parameter, the UE 202 is allowed, only when the event corresponding to the back-off event parameter occurs, to initiate again an access request for requesting to access the network slice NS 1. Certainly, after the back-off period expires, the UE 202 may initiate again an access request for requesting to access the network slice NS 1. Alternatively, the back-off time parameter and the back-off event parameter may be combined in such a manner to indicate that the UE 202 cannot initiate, again within the back-off period corresponding to the back-off time parameter, an access request for requesting to access the network slice NS 1. After the back-off time period expires, the UE 202 may initiate, again only when the event corresponding to the back-off event parameter occurs, an access request for requesting to access the network slice NS 1.

The back-off condition information in this embodiment of the present disclosure may be determined based on a network congestion status, a running status, configuration information of an operator, or the like. During specific implementation, the RAN node 204 may determine, based on a running status of the network slice NS 1, whether to accept or reject the access request message of the UE 202, and set the back-off time parameter based on running status information of the network slice NS 1. The running status information of the network slice NS 1 herein is information that may reflect a current running status or a current running situation of the network slice NS 1. For example, the running status information may be load information of the network slice NS 1, information indicating a congestion status such as a congestion level, a quantity of user equipments currently accessing the network slice NS 1, resource utilization on the network slice NS 1, or the like. Alternatively, the running status information may be information such as whether the network slice NS 1 encounters a fault, a specific fault type, a fault cause, or a time at which the fault is to be cleared. Alternatively, the running status information may be alarm information of the network slice NS 1, such as an alarm type or a time at which an alarm is to be removed.

The back-off time parameter is used as an example. When the network slice NS 1 encounters relatively severe congestion, the RAN node 204 may reject the access request message of the UE 202, and calculate the back-off time parameter based on the load information of the network slice NS 1 and the congestion status of the network slice NS 1. For example, when the congestion level representing a current congestion degree of the network slice NS 1 is relatively high, a back-off time parameter corresponding to a relatively long back-off period may be set. When the congestion level is relatively low, a back-off time parameter corresponding to a relatively short back-off period may be set. Alternatively, the RAN node 204 may reject the access request message of the UE 202 when the network slice NS 1 encounters a fault, and determine the back-off time parameter based on a time at which the fault is to be cleared, a parameter set by a network operator, a preset default parameter, or the like. Alternatively, the RAN node 204 may reject the access request message of the UE 202 when an alarm occurs on a network or the network slice NS 1, and determine the back-off time parameter based on information such as a type of the alarm and a time at which the alarm is to be removed.

That the RAN node 204 determines, based on the congestion level of the network slice NS 1, whether to reject the access request message of the UE 202 is specifically used as an example. When the congestion level of the network slice NS 1 reaches a preset level, the RAN node 204 rejects access of the UE to the network slice NS 1. The RAN node 204 may obtain the congestion level of the network slice NS 1 in any one of the following manners:

Manner a: The RAN node 204 may directly receive the congestion level of the network slice NS 1 from the CPE 206. For example, the CPE 206 sends the identification information of the network slice NS 1 and the congestion level of the network slice NS 1 to the RAN node 204. The congestion level of the network slice NS 1 may be obtained through calculation by the CPE 206 based on the load information of the network slice NS 1.

Manner b: The RAN node 204 may receive the load information of the network slice NS 1 from the CPE 206. For example, the CPE 206 sends the identification information of the network slice NS 1 and the load information of the network slice NS 1 to the RAN node 204, and the RAN node 204 obtains the congestion level of the network slice NS 1 through calculation based on the load information of the network slice NS 1.

Manner c: The RAN node 204 may receive a congestion level of the CPE 206 from the CPE 206, and the RAN node 204 then determines the congestion level of the network slice NS 1 based on the congestion level of the CPE 206 and information about the network slice supported by the CPE 206. Because the CPE 206 supports the network slice NS 1, the RAN node 204 may directly use the congestion level of the CPE 206 as the congestion level of the network slice NS 1, or may obtain the congestion level of the network slice NS 1 through calculation based on the congestion level of the CPE 206 by using a rule. This is not limited in this embodiment of the present disclosure.

Manner d: The RAN node 204 may receive load information of the CPE 206 from the CPE 206, and the RAN node 204 then determines the congestion level of the network slice NS 1 based on the load information of the CPE 206 and information about the network slice supported by the CPE 206. Because the CPE 206 supports the network slice NS 1, the RAN node 204 may directly use the load information of the CPE 206 as the load information of the network slice NS 1, and then obtain the congestion level of the network slice NS 1 through calculation based on the load information of the network slice NS 1. Alternatively, the RAN node 204 may obtain the load information of the network slice NS 1 through calculation based on the load information of the CPE 206 by using a rule, and then obtain the congestion level of the network slice NS 1 through calculation based on the load information of the network slice NS 1. This is not limited in this embodiment of the present disclosure.

The load information may be a specific parameter value indicating a current load status of the network slice or the control plane entity CPE. The congestion level indicates a current congestion severity of the network slice or the CPE. If the congestion level is transferred on a network by using a message, the congestion level may be expressed by using a parameter or an information element in the message, for example, expressed by using a congestion level parameter or a congestion level information element. A value of the congestion level parameter or the congestion level information element may be a specific parameter value corresponding to a meaning of high load, intermediate load, low load, or the like. Alternatively, the congestion level may be expressed by using a specific value, a specific percentage, or the like indicating a corresponding level. This is not limited in this embodiment of the present disclosure.

Part 306: After the UE 202 receives the rejection response message, when a condition corresponding to the back-off condition information is not met, the UE 202 no longer initiates an access request for accessing the network slice NS 1.

When the condition corresponding to the back-off condition information is not met, the UE may further request to access another network slice, for example, a network slice NS 2. Whether the condition corresponding to the back-off condition information is met in this embodiment of the present disclosure is described as follows:

(1) If the back-off condition information is the back-off time parameter, that the condition corresponding to the back-off condition information is met refers to that the back-off period corresponding to the back-off time parameter expires. However, that the condition corresponding to the back-off condition information is not met refers to that the back-off period has not expired. Specific implementation may be performed by disposing a timer on the UE 202 based on the back-off time parameter.

(2) If the back-off condition information is the back-off event parameter, that the condition corresponding to the back-off condition information is met refers to a case that the event corresponding to the back-off event parameter occurs. By contrast, if the event corresponding to the back-off event parameter has not occurred, the condition corresponding to the back-off condition information is not met.

(3) If the back-off condition information is the combination of the back-off time parameter and the back-off event parameter, the UE 202 determines, based on whether the back-off period corresponding to the back-off time parameter expires, whether the event corresponding to the back-off event parameter occurs, and a logical relationship of the combination, whether the condition corresponding to the back-off condition information is met.

That the back-off condition information is the back-off time parameter is specifically used as an example. Therefore, the UE 202 no longer initiates, within the back-off period corresponding to the back-off time parameter, an access request for requesting to access the network slice NS 1. If the UE 202 may support a plurality of network slices, for example, a plurality of network slices including the network slice NS 1 and the network slice NS 2, the UE may continue initiating an access request to the communications system 200 within the back-off period, to request to access another network slice in the communications system 200, for example, the network slice NS 2. After the back-off period expires, the UE 202 requests again to access the network slice NS 1.

The back-off time parameter in this embodiment of the present disclosure may be a duration parameter, and the duration parameter indicates duration of the back-off period, namely, duration for which the UE no longer initiates an access request to the network slice NS 1 after receiving the rejection response message.

Alternatively, the back-off time parameter in this embodiment of the present disclosure may be a time parameter, and the time parameter indicates a deadline of the back-off period, namely, a deadline after which the UE no longer initiates an access request to the network slice NS 1 after receiving the rejection response message.

It should be noted that after the condition corresponding to the back-off condition information is met, the UE 202 may immediately initiate an access request to the network slice NS 1, or may not immediately initiate the access request to the network slice NS 1 but may initiate the access request to the network slice NS 1 based on a service requirement after the back-off period.

In this embodiment of the present disclosure, back-off condition information is carried in a rejection response message returned to UE, a condition under which the UE requests again to access a network slice is set, and when a condition corresponding to the back-off condition information is not met, the UE no longer initiates access to the network slice, but may still request to access another network slice. Therefore, isolation of the network slice is ensured and user service experience is improved.

It should be further noted that identification information of a recommended network slice may be further carried in the rejection response message, and the identification information of the recommended network slice indicates the recommended network slice that the UE may access. The recommended network slice may be a default network slice, and the UE may access the network slice to obtain a basic service or an emergency service, such as an emergency call service or a general Internet access service having a relatively low data rate. Certainly, the identification information of the recommended network slice carried in the rejection response message may also be a list. The list corresponds to a plurality of recommended network slices and indicates the plurality of network slices that the UE may access. This may ensure that the UE may still obtain the basic service or the emergency service after the request for accessing the network slice NS 1 is rejected, so as to ensure that a network can provide the basic service or the emergency service for the UE, and user service experience is further improved.

In the foregoing embodiment of the present disclosure, the RAN node 204 has a congestion control function. After receiving the access request message sent by the UE, the RAN node 204 determines whether to reject the access request message. In an exemplary variant of this embodiment of the present disclosure, the RAN node 204 may forward the access request message to the control plane entity CPE 206, and the CPE 206 determines whether to accept or reject the access request message of the UE 202. Similarly, the CPE 206 may determine, based on the congestion level of the network slice NS 1, whether to reject the access request message of the UE. For example, when the congestion level of the network slice NS 1 reaches a preset level, the CPE 206 rejects access of the UE to the network slice NS 1.

Because the network slice NS 1 is a network slice supported by the CPE 206, the CPE 206 knows the load information of the network slice NS 1, and the CPE 206 may determine the congestion level of the network slice NS 1 based on the load information of the network slice NS 1. In this case, the back-off condition information is carried in the response message returned by the CPE 206 to the UE, and is used to set the condition under which the UE requests again to access the network slice. This ensures isolation of the network slice and improves user service experience.

Similarly, identification information of a recommended network slice may be further carried in the rejection response message sent by the CPE 206 to the UE 202, and indicates the recommended network slice that the UE may access. The recommended network slice may be a default network slice, and the UE may access the network slice to obtain a basic service or an emergency service. Certainly, the identification information of the recommended network slice carried in the rejection response message may also correspond to a plurality of recommended network slices, and indicates the plurality of network slices that the UE may access. This may ensure that the UE may still obtain the basic service or the emergency service even if the request of the UE for accessing the network slice NS 1 is rejected. This further improves user service experience.

Further, the rejection response message returned by the CPE 206 to the UE 202 may further include an access point name (APN) list, and the APN list indicates that the UE 202 cannot request to access an APN in the APN list when a condition corresponding to the back-off condition information is not met. One network slice may support a plurality of APNs, but the UE 202 does not know a correspondence between a network slice and an APN. Therefore, after the UE 202 receives the rejection response message, if the UE 202 initiates a request for accessing an APN supported by the network slice NS 1, the request is still rejected. Consequently, signaling waste is caused and user service experience is affected. The CPE 206 returns the APN list to the UE 202. This may avoid occurrence of the foregoing signaling waste and further improve user service experience.

In the foregoing embodiment and a variant of the foregoing embodiment of the present disclosure, the information about the network slice supported by the CPE 206 may be stored on the RAN node 204, for example, identification information such as a type of the network slice supported by the CPE 206, a network slice identifier, or a network slice instance identifier. The identification information of the network slice supported by the CPE 206 may be pre-stored on the RAN node 204, or may be obtained by the RAN node 204 through configuration performed by a network operator. For example, the RAN node 204 may receive configuration information sent by the CPE 206, and the configuration information includes the information about the network slice supported by the CPE 206. Specifically, the RAN node 204 may receive, by using an S1 interface configuration process or an NG2 interface configuration process, the information about the network slice supported by the CPE 206.

Further, a priority of each network slice supported by the CPE 206 may be further stored on the RAN node 204. The priority of each network slice may be pre-stored on the RAN node 204, or may be obtained by the RAN node 204 through configuration performed by the network operator, for example, through interaction with the CPE 206. The information about the network slice carried in the rejection response message in this embodiment of the present disclosure may be determined by the RAN node 204 or the CPE 206 based on the priority of the network slice. For example, a higher priority may be set for the network slice providing a basic service or an emergency service.

Figure 4:
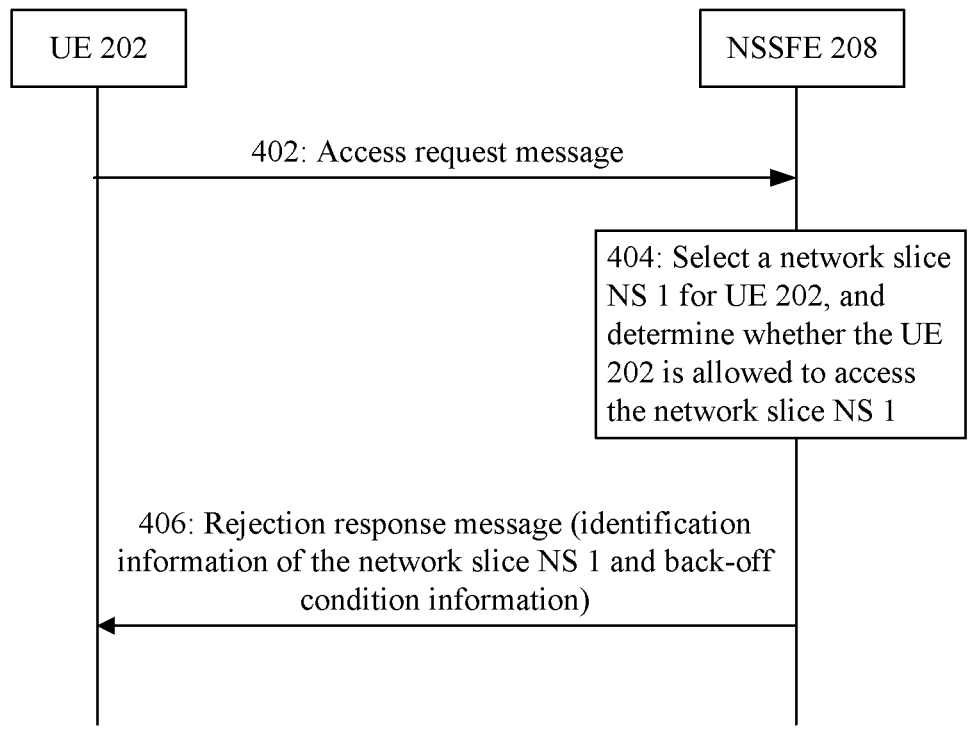
FIG. 4 is a schematic diagram of another access control method according to an embodiment of the present disclosure.

Based on the communications system shown in FIG. 2 in the embodiment of the present disclosure, referring to FIG. 4, another access control method is provided. The access control method may include the following parts:

Part 402: The user equipment UE 202 sends an access request message to the network slice selection function entity NSSFE 208 in the communications system 200, to request to access a mobile communications network.

It should be noted that the access request message sent by the UE 202 may be a non-access stratum (NAS) message, such as an attach message, a tracking area update (TAU) message, or a service request message. The access request message may be forwarded to the NSSFE 208 via the radio access network node RAN node 204.

The NSSFE 208 in this embodiment may be an independently deployed network element, or may be implemented on the CPE 206 by serving as a function module inside the CPE 206.

Part 404: After receiving the access request message, the NSSFE 208 selects a network slice providing a service for the UE 202, for example, a network slice NS 1; and the NSSFE 208 then determines, based on a running status of the network slice NS 1, whether the UE 202 is allowed to access the network slice NS 1. When the NSSFE 208 determines that the UE 202 is not allowed to access the selected network slice NS 1, the NSSFE 208 generates a rejection response message and sends the rejection response message to the UE 202. The rejection response message may be a NAS reject message.

In a further exemplary variant of the foregoing part 404, the NSSFE 208 sends, to the CPE 206, the network slice selected by the NSSFE 208 for the UE 202, and the CPE 206 determines whether the UE 202 can access the network slice NS 1.

It should be noted that the NSSFE 208 may select, based on one or a combination of the following information, the network slice NS 1 providing a service for the UE 202: a service type carried in the access request message, subscription data of the UE 202, capability information of the UE 202, and network policy information.

The rejection response message may include identification information of the network slice NS 1 and back-off condition information that indicates a condition under which the UE 202 may access the network slice NS 1 again. The back-off condition information may be a back-off time parameter, a back-off event parameter, or a combination of a back-off time parameter and a back-off event parameter.

The back-off time parameter is used as an example. During specific implementation, the NSSFE 208 may set the back-off time parameter based on running status information of the network slice NS 1. The running status information of the network slice NS 1 herein may be load information of the network slice NS 1, information indicating a congestion status such as a congestion level, a quantity of user equipments currently accessing the network slice NS 1, resource utilization on the network slice NS 1, or the like. Alternatively, the running status information may be information such as whether the network slice NS 1 encounters a fault, a specific fault type, a fault cause, or a time at which the fault is to be cleared. Alternatively, the running status information may be alarm information of the network slice NS 1, such as an alarm type or a time at which an alarm is to be removed.

For example, when the congestion level of the network slice NS 1 is relatively high, a back-off time parameter corresponding to a relatively long back-off period may be set. Alternatively, the NSSFE 208 may reject an access request of the UE when the network slice NS 1 encounters a fault, and determine the back-off time parameter based on a time at which the fault is to be cleared, a parameter preset by a network operator, a preset default parameter, or the like. Alternatively, the NSSFE 208 may reject an access request of the UE when an alarm occurs on a network or the network slice NS 1, and determine the back-off time parameter based on information such as a type of the alarm and a time at which the alarm is to be removed.

Part 406: After the UE 202 receives the rejection response message, when a condition corresponding to the back-off condition information is not met, the UE 202 no longer initiates an access request for accessing the network slice NS 1. Specific implementation is similar to the foregoing part 306 in the embodiment of the present disclosure.

When the condition corresponding to the back-off condition information is not met, the UE may further request to access another network slice, for example, a network slice NS 2. Particularly, identification information of the another network slice may be further carried in the rejection response message returned by the NSSFE 208 to the UE 202, and indicates one or more network slices that the UE may access. It may be ensured, based on identification information of a recommended network slice, that the UE 202 may still obtain a basic service or an emergency service even if the network slice NS 1 selected by the NSSFE 208 for the UE 202 cannot provide a service for the UE 202. This further improves user service experience.

Further, the rejection response message returned by the NSSFE 208 to the UE 202 may further include an APN list, and the APN list indicates that the UE 202 cannot request to access an APN in the APN list when a condition corresponding to the back-off condition information is not met. This may avoid causing signaling waste and improve user service experience.

In the foregoing embodiment and a variant of the foregoing embodiment of the present disclosure, information about a network slice supported by the CPE 206 may be stored on the NSSFE 208, for example, identification information such as a type of the network slice supported by the CPE 206, a network slice identifier, or a network slice instance identifier. The identification information of the network slice supported by the CPE 206 may be pre-stored on the NSSFE 208, or may be obtained by the NSSFE 208 through configuration performed by a network operator. For example, the NSSFE 208 may receive configuration information sent by the CPE 206, and the configuration information includes the information about the network slice supported by the CPE 206.

Further, a priority of each network slice supported by the CPE 206 may be further stored on the NSSFE 208. The priority of each network slice may be pre-stored on the NSSFE 208, or may be obtained by the NSSFE 208 through configuration performed by the network operator, for example, through interaction with the CPE 206. The information about the network slice carried in the rejection response message in this embodiment of the present disclosure may be determined by the NSSFE 208 based on the priority of the network slice. For example, a higher priority may be set for the network slice providing a basic service or an emergency service.

Figure 5:
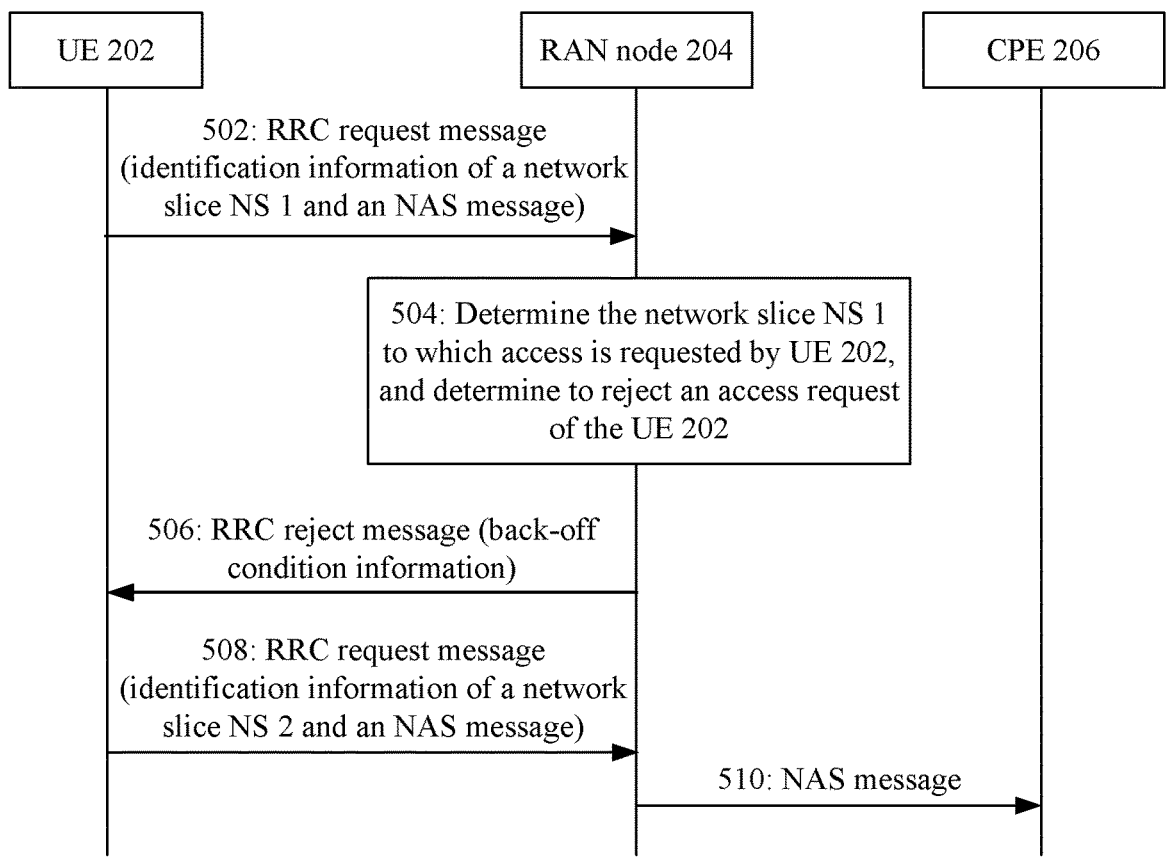
FIG. 5 is a schematic diagram of a method of a technical implementation 1 according to an embodiment of the present disclosure.

A technical implementation 1 provided in an embodiment of the present disclosure is described below with reference to FIG. 5.

Part 502: The UE 202 sends an RRC request message to the RAN node 204, where the RRC request message includes a NAS message, for example, a UE request, and the RRC request message further includes identification information of a network slice. The network slice may be a network slice supported by the control plane entity CPE 206 in the communications system 200.

The RRC request message including a NAS message is used as an example herein. Alternatively, the RRC request message may include an attach message, a TAU message, a service request message, or the like.

Part 504: After receiving the RRC request message sent by the UE 202, the RAN node 204 obtains the identification information of the network slice in the RRC request message, and the RAN node 204 determines, based on the identification information, that a network slice that the UE 202 requests to access is a network slice NS 1; and the RAN node 204 determines to reject an access request of the UE 202. For example, when the network slice NS 1 encounters a fault, severe congestion, or the like, the RAN node 204 may reject the access request of the UE 202.

Part 506: The RAN node 204 sends an RRC reject message to the UE 202, to reject the access request of the UE 202 for requesting to access the network slice NS 1, where the RRC reject message includes back-off condition information, and the back-off condition information indicates a condition under which the UE 202 requests again to access the network slice NS 1.

Part 508: When the UE 202 is capable of accessing a plurality of network slices, the UE 202 may continue sending an RRC request message to the RAN node 204, where the RRC request message includes identification information of another network slice, for example, a network slice NS 2, and a NAS message.

Part 510: The RAN node 204 determines, based on a running status of the network slice NS 2, that an access request of the UE 202 for requesting to access the network slice NS 2 is accepted, the RAN node 204 forwards the NAS message to the CPE 206, and the CPE 206 executes a processing process in which the UE 202 accesses the network slice NS 2.

In the technical implementation 1 of the present disclosure, when a RAN node rejects an access request of UE, a condition under which the UE requests again to access a network slice is set. Before the condition is met, the UE cannot request to access the network slice. This may effectively resolve a network congestion problem, and the UE may still use some network services, improving user service experience.

Figure 6:
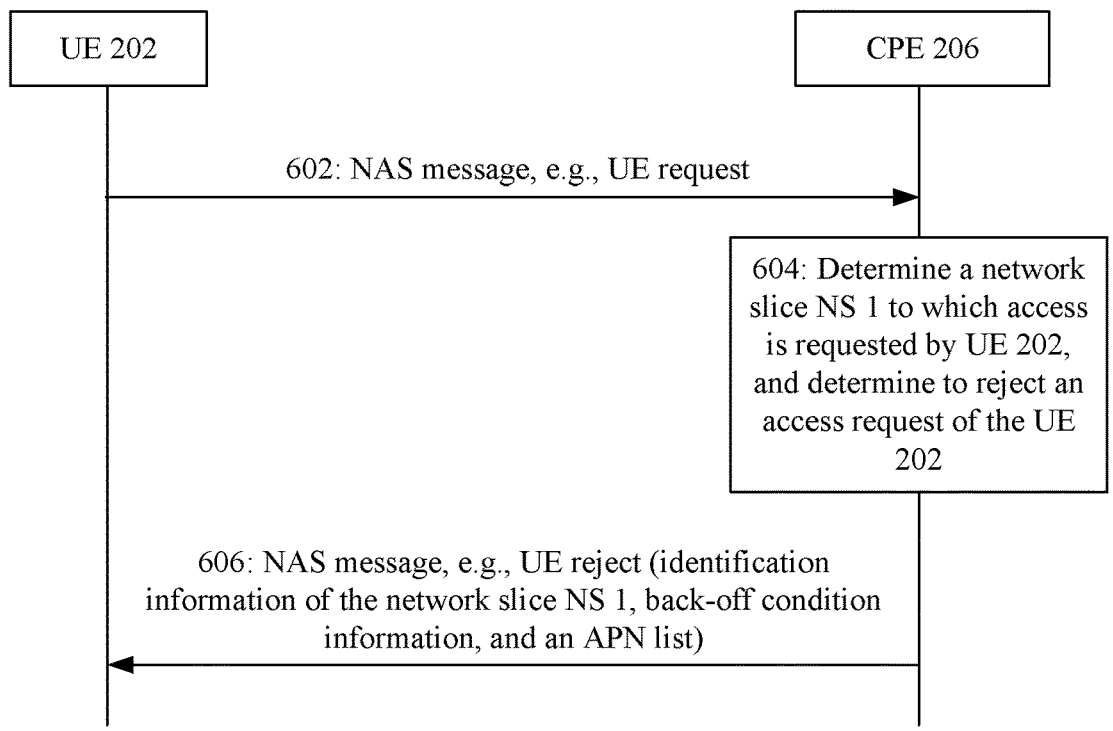
FIG. 6 is a schematic diagram of a method of a technical implementation 2 according to an embodiment of the present disclosure.

A technical implementation 2 provided in an embodiment of the present disclosure is described below with reference to FIG. 6.

In the technical implementation 2, when rejecting a request of the user equipment UE 202 for accessing a network slice, the control plane entity CPE 206 returns back-off condition information and an APN list to the UE 202.

Part 602: The control plane entity CPE 206 receives a NAS message sent by the UE 202, for example, a UE request.

The NAS message may be carried in an RRC message, is sent by the UE 202 to the RAN node 204, and is then forwarded by the RAN node 204 to the CPE 206.

Part 604: The CPE 206 determines that the network slice that the UE requests to access 202 is a network slice NS 1; and the CPE 206 determines to reject the access request of the UE 202. For example, when the network slice NS 1 encounters a fault, severe congestion, or the like, the CPE 206 may reject the access request of the UE 202.

It should be noted that the CPE 206 may determine, based on identification information of the network slice carried in the NAS message, that the network slice that the UE requests to access 202 is the network slice NS 1.

When the identification information of the network slice NS 1 is not included in the NAS message, the CPE 206 may select, based on one or a combination of the following information, a network slice providing a service for the UE 202, for example, the network slice NS 1: a service type carried in the NAS message, subscription data of the UE 202, capability information of the UE 202, network policy information, and the like. In this case, the CPE 206 has a function of selecting a network slice for the UE. That is, the NSSFE 208 is implemented on the CPE 206 by serving as a function module inside the CPE 206.

Part 606: The CPE 206 sends the NAS message to the UE 202, for example, UE reject, to reject the access request of the UE 202, where the NAS message includes identification information of the network slice NS 1, back-off condition information, and an APN list.

It should be noted that if the NAS message received by the CPE 206 carries the identification information of the network slice NS 1, the NAS message UE reject returned by the CPE 206 to the UE 202 may not carry the identification information of the network slice NS 1. A NAS message is used as an example herein; alternatively, another message such as an attach message, a TAU message, or a service request message may be used.

After the UE 202 receives the NAS message, e.g., UE reject, when a condition corresponding to the back-off condition information is not met, the UE 202 cannot initiate an access request for accessing the network slice NS 1 or an access request for accessing an APN in the APN list.

In the technical implementation 2 of the present disclosure, after CPE rejects an access request of UE, before a specified condition is met, the UE no longer initiates an access request to a specified network slice, and also cannot initiate an access request to a specified APN. This may effectively resolve a network congestion problem, and can also ensure that the UE may still more pertinently use some network services, improving user service experience.

It will be appreciated that, in combination with the examples described in the embodiments disclosed in this specification, units and algorithm steps in the present disclosure may be implemented in a form of hardware or in a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 7:
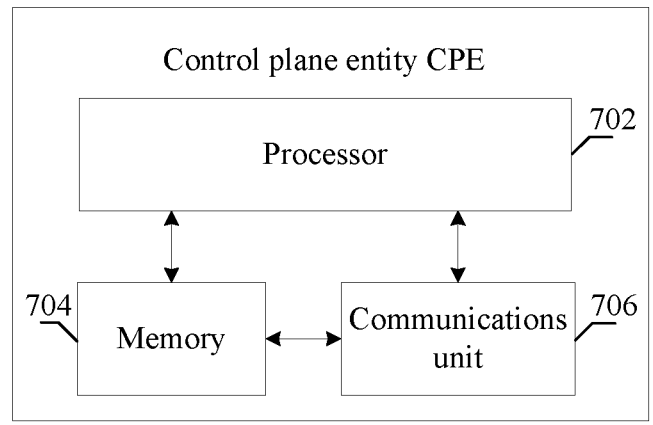
FIG. 7 is a schematic structural diagram of a control plane entity according to an embodiment of the present disclosure.

FIG. 7 is an exemplary schematic structural diagram of a control plane entity (CPE) according to an embodiment of the present disclosure. The CPE may include a processor 702, a memory 704, and a communications unit 706. The processor 702, the memory 704, and the communications unit 706 cooperate with each other, so that technical solutions of the technical implementations in the foregoing embodiments of the present disclosure may be implemented. For example, the communications unit 706 may be configured to receive an access request message sent by user equipment (UE). The processor 702 may be configured to: determine a network slice that the UE requests to access, and determine whether to reject an access request of the UE for requesting to access the network slice. When the processor 702 determines to reject the access request of the UE for accessing the network slice, the communications unit 706 returns a rejection response message to the UE, and the rejection response message includes back-off condition information, and the back-off condition information indicates a condition under which the UE requests again to access the network slice. The memory 704 may be configured to store program code and data. When the program code runs, the CPE may implement technical solutions of technical implementations in the foregoing embodiments of the present disclosure.

Figure 8:
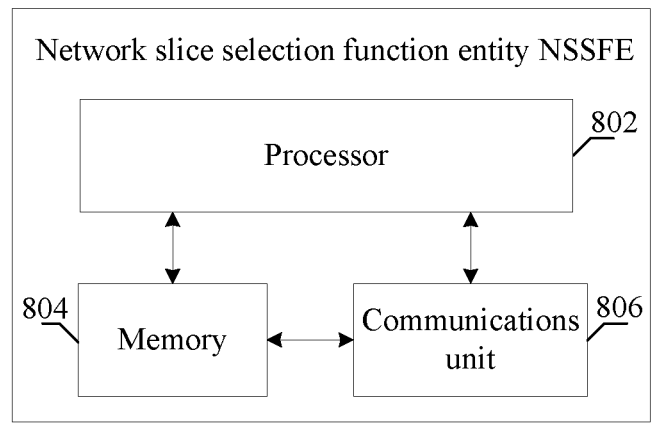
FIG. 8 is a schematic structural diagram of a network slice selection function entity according to an embodiment of the present disclosure.

FIG. 8 is an exemplary schematic structural diagram of a network slice selection function entity (NSSFE) according to an embodiment of the present disclosure. The NSSFE may include a processor 802, a memory 804, and a communications unit 806. The processor 802, the memory 804, and the communications unit 806 cooperate with each other, so that technical solutions of the technical implementations in the foregoing embodiments of the present disclosure may be implemented. For example, the communications unit 806 may be configured to receive an access request message sent by user equipment (UE). The processor 802 may be configured to: determine a network slice that the UE requests to access, and determine whether to reject an access request of the UE for requesting to access the network slice. When the processor 802 determines to reject the access request of the UE for accessing the network slice, the communications unit 806 returns a rejection response message to the UE, and the rejection response message includes back-off condition information, and the back-off condition information indicates a condition under which the UE requests again to access the network slice. The memory 804 may be configured to store program code and data. When the program code runs, the NSSFE may implement technical solutions of technical implementations in the foregoing embodiments of the present disclosure. It should be noted that the NSSFE may be deployed as an independent network element, or may be implemented on a CPE by serving as a function module inside the CPE.

Figure 9:
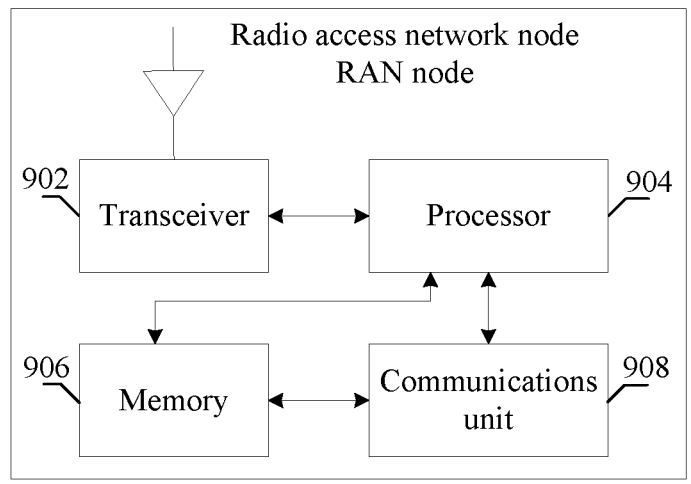
FIG. 9 is a schematic structural diagram of a radio access network node according to an embodiment of the present disclosure.

FIG. 9 is an exemplary schematic structural diagram of a radio access network node (RAN node) according to an embodiment of the present disclosure. The RAN node includes a transceiver 902 and a processor 904. The transceiver 902 may be configured to support receiving and sending information between the RAN node and user equipment (UE) in this embodiment of the present disclosure. The processor 904 may be configured to execute various functions used to communicate with the UE or another network device. On an uplink, an uplink signal from the UE is received by using an antenna, and is demodulated by the transceiver 902. The processor 904 further processes service data and signaling information that are sent by the UE. On a downlink, service data and a signaling message are processed by the processor 904, and are demodulated by the transceiver 902 to generate a downlink signal. The downlink signal is transmitted to the UE by using an antenna.

The RAN node may further include a memory 906. The memory 906 may be configured to store program code and data. When the program code runs, the RAN node may implement technical solutions in the foregoing embodiment of the present disclosure. The RAN node may further include a communications unit 908, configured to support the RAN node to communicate with another network entity, such as a control plane entity (CPE) or a network slice selection function entity (NSSFE). The processor 904 is further configured to perform methods described in the foregoing embodiments. After receiving an access request message sent by the UE, the transceiver 902 determines a network slice that the UE requests to access, and determines whether to reject an access request of the UE for accessing the network slice. When the processor 904 determines to reject the access request of the UE for accessing the network slice, the transceiver 902 returns a rejection response message to the UE. The rejection response message includes back-off condition information, and the back-off condition information indicates a condition under which the UE requests again to access the network slice.

It may be understood that FIG. 9 shows merely a simplified design of the radio access network node. During actual application, the radio access network node may include any quantity of transceivers, processors, memories, communications units, and the like.

Figure 10:
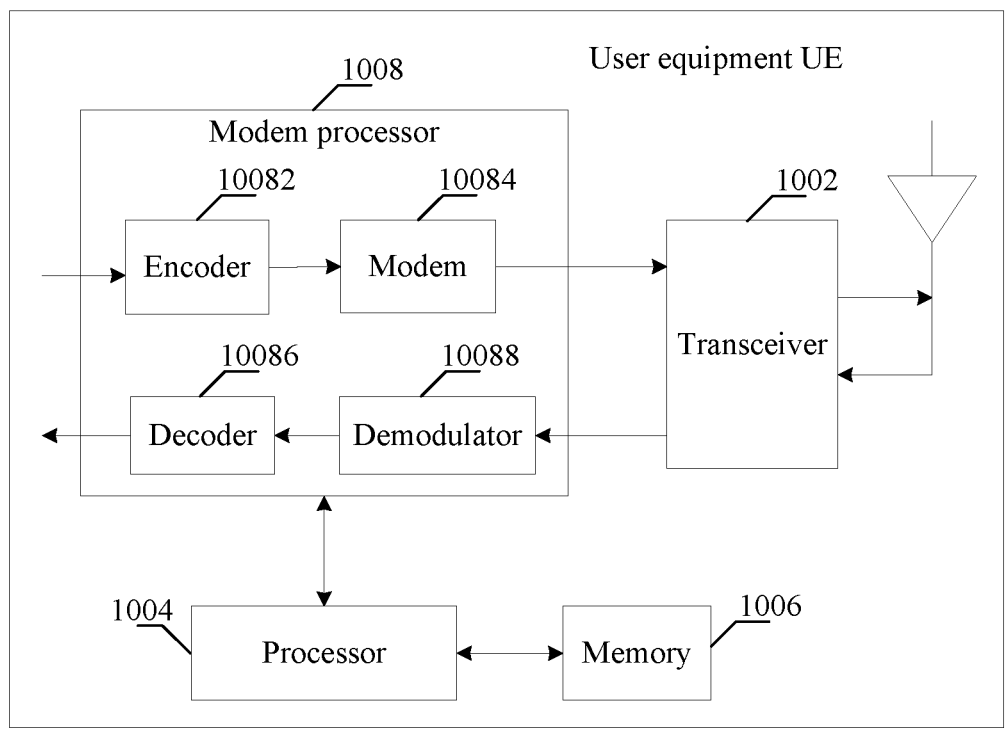
FIG. 10 is a schematic structural diagram of user equipment according to an embodiment of the present disclosure.

FIG. 10 is an exemplary schematic structural diagram of user equipment (UE) according to the foregoing embodiments. The user equipment (UE) includes a transceiver 1002 and a processor 1004, and may further include a memory 1006 and a modem processor 1008.

The transceiver 1002 adjusts (for example, performs analog conversion, filtering, amplification, up-conversion and the like on) an output sample and generates an uplink signal. The uplink signal is transmitted to a radio access network node (RAN node) in this embodiment of the present disclosure by using an antenna. On a downlink, the antenna receives a downlink signal transmitted by the RAN node. The transceiver 1002 adjusts (for example, performs filtering, amplification, down-conversion, digitization and the like on) the signal received by the antenna and provides an input sample. In the modem processor 1008, an encoder 10082 receives service data and a signaling message that are to be sent on an uplink, and processes (such as formats, encodes, or interleaves) the service data and the signaling message. A modulator 10084 further processes (for example, performs symbol mapping and modulation on) encoded service data and an encoded signaling message and provides an output sample. A demodulator 10088 processes (such as demodulates) the input sample and provides symbol estimation. A decoder 10086 processes (such as deinterleaves and decodes) the symbol estimation and provides decoded data and a decoded signaling message that are sent to the UE. The encoder 10082, the modulator 10084, the demodulator 10088, and the decoder 10086 may be implemented by the composite modem processor 1008. These units are processed by using a radio access technology used by a radio access network.

The processor 1004 controls and manages an action of the UE, and is configured to perform processing performed by the UE in this embodiment of the present disclosure. After the UE receives a rejection response message including back-off condition information, the processor 1004 determines, based on the back-off condition information, a condition under which the UE requests again to access a network slice. The memory 1006 is configured to store program code and data. When the program code runs, the UE may implement technical solutions in the foregoing embodiment of the present disclosure.

The processors, which are configured to perform the embodiments of the present disclosure, of the control plane entity (CPE), the network slice selection function entity (NSSFE), the user equipment (UE), and the radio access network node (RAN node) may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various examples of logical blocks, modules, and circuits that are described with reference to content disclosed in the present disclosure. Alternatively, the processor may be a combination of processors implementing a computing function, for example, a combination of one or more microprocessors, or a combination of a DSP and a microprocessor.

Methods or algorithm steps described in combination with the content disclosed in the present disclosure may be implemented by hardware, or may be implemented by a processor executing a software instruction. The software instruction may be included in a corresponding software module. The software module may be located in a random access memory (RAM) memory, a flash memory, a read-only memory (ROM) memory, an erasable programmable read-only memory (EPROM) memory, an electrically erasable programmable read-only memory (EEPROM) memory, a register, a hard disk, a removable magnetic disk, a compact disc read-only memory (CD-ROM), or a storage medium of any other form known in the art. An example of a storage medium is coupled to a processor, so that the processor can read information from the storage medium or write information into the storage medium. Certainly, the storage medium may be a component of the processor. The processor and the storage medium may be located in an ASIC.

Figure 11:
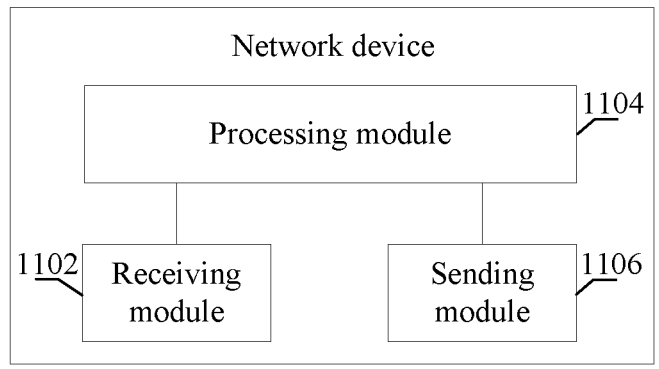
FIG. 11 is a schematic structural diagram of a network device according to an embodiment of the present disclosure.

FIG. 11 is an exemplary schematic structural diagram of a network device according to an embodiment of the present disclosure. The network device may be a radio access network node (RAN node), a control plane entity (CPE), or a network slice selection function entity (NSSFE). The network device includes a receiving module 1102, a processing module 1104, and a sending module 1106.

The receiving module 1102 is configured to receive an access request message sent by user equipment (UE).

The processing module 1104 is configured to: determine, based on the access request message, a network slice that the UE requests to access, and determine whether to reject an access request of the UE for accessing the network slice.

When the processing module 1104 determines to reject the access request of the UE for accessing the network slice, the sending module 1106 is configured to return a rejection response message to the UE, where the rejection response message includes back-off condition information, and the back-off condition information indicates a condition under which the UE requests again to access the network slice.

It should be noted that when the condition corresponding to the back-off condition information is not met, the UE no longer initiates an access request for accessing the network slice, for example, a network slice NS 1. However, the UE may further request to access another network slice, for example, a network slice NS 2. When the condition corresponding to the back-off condition information is met, the UE requests again to access the network slice NS 1.

It should be noted that when the network device is the radio access network node (RAN node), the processing module 1104 may determine, based on identification information of the network slice carried in the access request message, the network slice that UE requests to access.

When the network device is the control plane entity (CPE), when the identification information of the network slice is carried in the access request message, the processing module 1104 may determine, based on the identification information, the network slice that the UE requests to access. When the identification information of the network slice is not carried in the access request message, that the processing module 1104 determines, based on the access request message, the network slice that the UE requests to access is specifically that the processing module 1104 selects, based on one or a combination of the following information, a network slice providing a service for the UE: a service type carried in the access request message, subscription data of the UE, capability information of the UE, network policy information, and the like.

If the network device is the network slice selection function entity (NSSFE), that the processing module 1104 determines, based on the access request message, the network slice that the UE requests to access is specifically selecting, based on one or a combination of the following information, a network slice providing a service for the UE: a service type carried in the access request message, subscription data of the UE, capability information of the UE, network policy information, and the like.

Optionally, the back-off condition information includes one or a combination of the following information:

a back-off time parameter, indicating that the UE requests, again after a back-off period corresponding to the back-off time parameter expires, to access the network slice; and a back-off event parameter, indicating that when an event corresponding to the back-off event parameter occurs, the UE is allowed to request again to access the network slice.

Optionally, the back-off time parameter is determined by the network device based on running status information of the network slice. The running status information of the network slice includes one of or any combination of the following information: load information of the network slice, congestion information of the network slice, alarm information of the network slice, fault information of the network slice, a quantity of users accessing the network slice, and resource occupation information of the network slice.

Optionally, the rejection response message further includes identification information of a recommended network slice, and the identification information indicates the network slice that the UE requests to access when a back-off condition corresponding to the back-off condition information is not met.

Optionally, the rejection response message further includes APN list, and the APN list indicates that the UE cannot request to access an APN in the APN list when a condition corresponding to the back-off condition information is not met.

Figure 12:
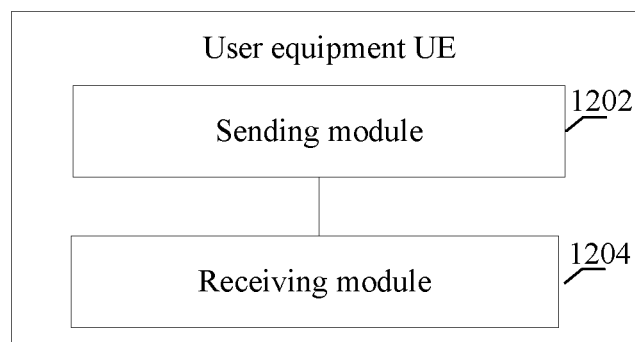
FIG. 12 is a schematic structural diagram of user equipment according to an embodiment of the present disclosure.

FIG. 12 is an exemplary schematic structural diagram of user equipment UE according to the foregoing embodiments. The UE includes a sending module 1202 and a receiving module 1204.

The sending module 1202 is configured to send an access request message to a network device.

The receiving module 1204 is configured to receive a rejection response message from the network device, where the rejection response message includes back-off condition information, the back-off condition information indicates a condition under which the UE requests again to access a network slice, and the network slice is determined by the network device based on the access request message.

It should be noted that when the condition corresponding to the back-off condition information is not met, the UE no longer initiates an access request for accessing the network slice, for example, a network slice NS 1. However, the UE may further request to access another network slice, for example, a network slice NS 2. When the condition corresponding to the back-off condition information is met, the UE requests again to access the network slice NS 1.

Optionally, the back-off condition information includes one or a combination of the following information:

a back-off time parameter, indicating that the UE requests, again after a back-off period corresponding to the back-off time parameter expires, to access the network slice; and a back-off event parameter, indicating that when an event corresponding to the back-off event parameter occurs, the UE is allowed to request again to access the network slice.

Optionally, the back-off time parameter is determined by the network device based on running status information of the network slice. The running status information of the network slice includes one of or any combination of the following information: load information of the network slice, congestion information of the network slice, alarm information of the network slice, fault information of the network slice, a quantity of users accessing the network slice, and resource occupation information of the network slice.

Optionally, the rejection response message further includes identification information of a recommended network slice, and the identification information indicates the network slice that the UE requests to access when a back-off condition corresponding to the back-off condition information is not met.

Optionally, the rejection response message further includes an APN list, and the APN list indicates that the UE cannot request to access an APN in the APN list when a condition corresponding to the back-off condition information is not met.

Optionally, the network device is a radio access network node (RAN node), a control plane entity (CPE), or a network slice selection function entity (NSSFE).

Compared with the prior art, the network device and the user equipment (UE) that are provided in this embodiment of the present disclosure cooperate with each other, and a condition under which the UE requests again to access a network slice is set based on back-off condition information. This ensures isolation of the network slice and improves user service experience.

The rejection response message further includes the identification information of the recommended network slice in this embodiment of the present disclosure, so that the UE may still obtain a basic service or an emergency service after the access request of the UE for requesting to access a network slice is rejected, further improving user service experience.

An APN that cannot be accessed by the UE when the condition corresponding to the back-off condition information is not met is further set in this embodiment of the present disclosure based on an APN list. This may avoid causing signaling waste, improving network efficiency and user service experience.

A person skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

Objectives, technical solutions, and benefits of the present disclosure are further described in detail in the foregoing exemplary implementations. It should be understood that the foregoing descriptions are merely exemplary implementations of the present disclosure, but are not intended to limit the protection scope of the present disclosure. Any modification, equivalent replacement, or improvement made within the spirit and principle of the present disclosure may fall within the protection scope of the present disclosure.

What is claimed is:

1. An access control method, comprising:
   receiving, by a network device, an access request from a user equipment (UE), wherein the access request comprises identification information of a network slice;
   determining, by the network device, whether to reject the access request; and
   in response to the network device determining to reject the access request, returning, by the network device, a rejection response message to the UE, wherein the rejection response message comprises both a back-off event parameter and a back-off time parameter;
   wherein the back-off event parameter indicates that the UE being allowed to again request access to the network slice is conditioned upon occurrence of an event, wherein the event is the UE receiving a paging message from a radio access network (RAN);
   wherein the back-off time parameter indicates a back-off period; and
   wherein during the back-off period corresponding to the back-off time parameter, the UE is not allowed to request access to the network slice unless the event corresponding to the back-off event parameter occurs, in which case the UE is allowed to request access to the network slice during the back-off period corresponding to the back-off time parameter based on the occurrence of the event corresponding to the back-off event parameter.

2. The method according to claim 1, further comprising:
   determining, by the network device, the back-off event parameter based on running status information of the network slice.

3. The method according to claim 1, wherein the rejection response message further comprises identification information of a second network slice.

4. The method according to claim 1, wherein the rejection response message further comprises an access point name (APN) list indicating one or more APNs to which the UE cannot request access during the back-off period.

5. The method according to claim 1, wherein the network device is a RAN node.

6. The method according to claim 5, wherein determining whether to reject the access request is based on congestion status of the network slice.

7. The method according to claim 6, further comprising:
   receiving, by the RAN node, from a control plane entity supporting the network slice, a congestion level of the network slice or a congestion level of the control plane entity.

8. The method according to claim 7, wherein the congestion level of the network slice or the congestion level of the control plane entity is expressed by a percentage indicating the congestion level of the network slice or the congestion level of the control plane entity, respectively.

9. The method according to claim 1, wherein the network device is a control plane entity (CPE).

10. A network device, comprising a processor and a non-transitory computer-readable medium having processor-executable instructions stored thereon, wherein the processor-executable instructions, when executed by the processor, facilitate:
    receiving an access request from a user equipment (UE), wherein the access request comprises identification information of a network slice;
    determining whether to reject the access request; and
    in response to determining to reject the access request, returning a rejection response message to the UE, wherein the rejection response message comprises both a back-off event parameter and a back-off time parameter;
    wherein the back-off event parameter indicates that the UE being allowed to again request access to the network slice is conditioned upon occurrence of an event, wherein the event is the UE receiving a paging message from a radio access network (RAN);
    wherein the back-off time parameter indicates a back-off period; and wherein during the back-off period corresponding to the back-off time parameter, the UE is not allowed to request access to the network slice unless the event corresponding to the back-off event parameter occurs, in which case the UE is allowed to request access to the network slice during the back-off period corresponding to the back-off time parameter based on the occurrence of the event corresponding to the back-off event parameter.

11. The network device according to claim 10, wherein the back-off time parameter is determined by the network device based on running status information of the network slice.

12. The network device according to claim 10, wherein the rejection response message further comprises identification information of a second network slice.

13. The network device according to claim 10, wherein the rejection response message further comprises an access point name (APN) list indicating one or more APNs to which the UE cannot request access during the back-off period.

14. The network device according to claim 10, wherein the network device is a RAN node.

15. The network device according to claim 10, wherein the network device is a control plane entity (CPE).

16. An access control method, comprising:
receiving, by a network device, an access request from a user equipment (UE), wherein the access request comprises identification information of a network slice;
determining, by the network device, whether to reject the access request; and
in response to the network device determining to reject the access request, returning, by the network device, a rejection response message to the UE, wherein the rejection response message comprises both a back-off event parameter and a back-off time parameter;
wherein the back-off event parameter indicates that the UE being allowed to again request access to the network slice is conditioned upon occurrence of an event, wherein the event is the UE receiving a paging message from a radio access network (RAN);
wherein the back-off time parameter indicates a back-off period; and
wherein, based on the back-off time parameter and the back-off event parameter of the rejection response message, the UE is not allowed to again request access to the network slice until after the back-off period corresponding to the back-off time parameter has expired and the event corresponding to the back-off event parameter has occurred after the expiration of the back-off period.

\* \* \* \* \*